(12) United States Patent
Olar et al.

(10) Patent No.: US 9,073,249 B2
(45) Date of Patent: Jul. 7, 2015

(54) SWIVEL SIDE ACTION FOR PLASTIC INJECTION MOLDS

(71) Applicants: David V Olar, Troy, MI (US); James P. Mantua, Beverly Hills, MI (US); David E Compeau, Oxford, MI (US)

(72) Inventors: David V Olar, Troy, MI (US); James P. Mantua, Beverly Hills, MI (US); David E Compeau, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 106 days.

(21) Appl. No.: 13/874,674

(22) Filed: May 1, 2013

(65) Prior Publication Data

US 2014/0328968 A1    Nov. 6, 2014

(51) Int. Cl.
*B29C 45/44* (2006.01)
*B29C 45/33* (2006.01)

(52) U.S. Cl.
CPC ............... *B29C 45/332* (2013.01); *B29C 45/44* (2013.01); *B29C 2045/336* (2013.01)

(58) Field of Classification Search
CPC ................ B29C 45/0046; B29C 45/14073; B29C 45/2628; B29C 45/44; B29C 45/401
USPC ......................................... 425/577
See application file for complete search history.

(56) References Cited

U.S. PATENT DOCUMENTS

| 5,720,907 A * | 2/1998 | Anderson et al. ........... 264/1.25 |
| 6,491,513 B1 * | 12/2002 | Schneider ..................... 425/577 |
| 2008/0179793 A1 * | 7/2008 | Schad et al. .................. 264/334 |

* cited by examiner

*Primary Examiner* — Yogendra Gupta
*Assistant Examiner* — Emmanuel S Luk
(74) *Attorney, Agent, or Firm* — Ralph E Smith

(57) ABSTRACT

An actuator for an injection mold is provided and may include a housing, a projection rotatably supported by the housing and movable between an extended state and a retracted state, and a cam supported by the housing. The cam may selectively move the projection between the extended state and the retracted state relative to the housing.

20 Claims, 4 Drawing Sheets

SWIVEL SIDE ACTION FOR PLASTIC INJECTION MOLDS

FIELD

The present disclosure relates to injection molds and more particularly to an actuator for an injection mold.

BACKGROUND

Injection molds such as plastic-injection molds are used in a wide variety of industries to produce a myriad of components. For example, plastic-injection molds are used in the automotive industry to produce trim components and fasteners, just to name a few.

Plastic-injection molds typically include a first mold half and a second mold half that cooperate to create a cavity when in a closed state. Specifically, when the first mold half and the second mold half are in contact with one another, the mold is in the closed state and a cavity is formed therebetween. The cavity defines the shape of the resulting component formed by the mold and may include an actuator disposed therein that aids in the formation of the resulting component as well as its ejection from the mold following formation.

The actuator may include a projection that is linearly movable between an extended state and a retracted state. When the projection is in the extended state, the projection may be used to form an aperture or recess in the resulting component by preventing resin from flowing in an area of the projection. Following formation of the aperture or recess, the projection may be moved into the retracted state to permit removal of the resulting component from the mold.

During operation, one or both of the first mold half and the second mold half are moved along an axis toward one another until the first mold half and the second mold half are in contact with one another. At this point, the mold is in the closed state and the cavity is formed. If the mold includes an actuator having a projection, the projection is moved linearly and along an axis into the extended state to allow the projection to cooperate with the cavity to define the shape of the resulting component formed by the mold.

A supply of resin is typically heated remotely from the mold to allow the resin to flow into the cavity formed between the first mold half and the second mold half. The resin may be transferred to the mold via an auger that forces the molten resin into the cavity under pressure. The molten resin flows into the cavity and around the projection, thereby filling the void and taking the shape of the cavity. Once the resin sufficiently cools, the first mold half and the second mold half are separated, the projection is linearly moved from the extended state to the retracted state, and the resulting component is ejected from the mold.

While conventional molds permit formation of a component having a desired net shape, such molds are restricted by linear actuators. Namely, conventional molds must provide sufficient clearance to allow the projection to move along a linear axis between the extended state and the retracted state. Accordingly, conventional molds cannot accommodate a component having a net shape that includes a portion formed along the linear axis of the projection, as such a portion would prevent the projection from moving between the extended state and the retracted state.

SUMMARY

In one configuration, an actuator for an injection mold is provided and may include a housing, a projection rotatably supported by the housing and movable between an extended state and a retracted state, and a cam supported by the housing. The cam may selectively move the projection between the extended state and the retracted state relative to the housing.

In another configuration, a mold is provided and may include a first mold half, a second mold half cooperating with the first mold half to define a cavity, and an actuator supported by one of the first mold half and the second mold half. The actuator may include a projection selectively rotatable relative to the one of the first mold half and the second mold half between an extended state extending into the cavity and a retracted state removed from the cavity.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
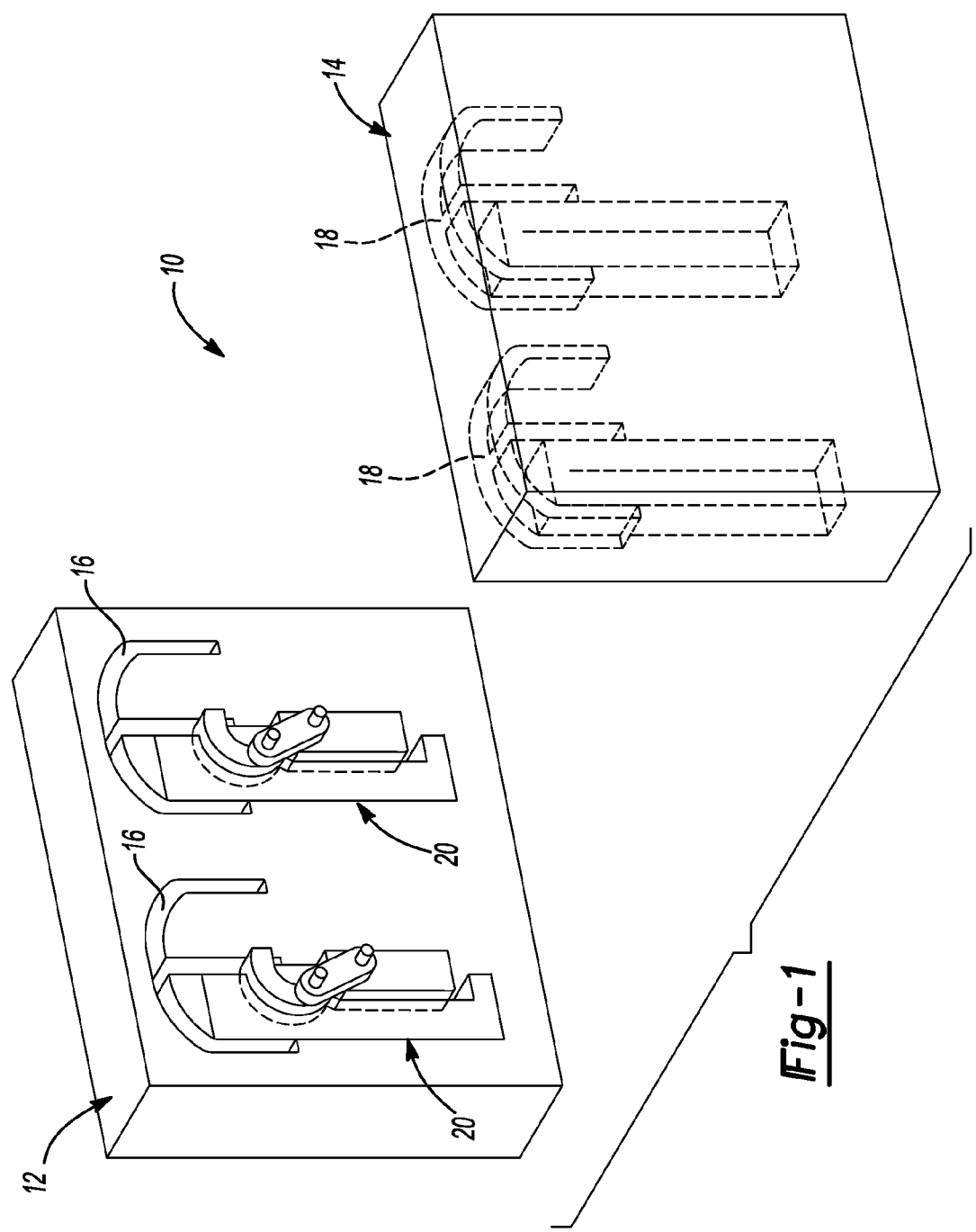
FIG. 1 is a perspective view of a mold in accordance with the principles of the present disclosure shown in a separated state.

With reference to the figures, a mold 10 is provided and may include a first mold half 12 and a second mold half 14. The first mold half 12 may include a first cavity 16 and the second mold half 14 may include a second cavity 18, whereby the first cavity 16 cooperates with the second cavity 18 when the first mold half 12 and the second mold half 14 are moved into a closed state such that the first mold half 12 is in contact with the second mold half 14. When the first mold half 12 and the second mold half 14 are in the closed state, the first cavity 16 and the second cavity 18 cooperate to define a void (not labeled) between the first mold half 12 and the second mold half 14 that provides the shape of a molded component (FIGS. 6-7).

Figure 6:
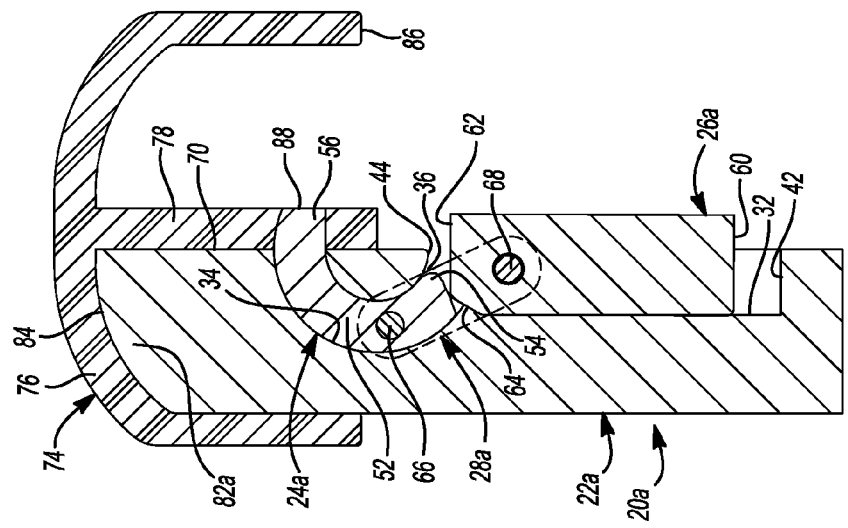
FIG. 6 is a cross-sectional view of an actuator for use with the mold of FIG. 1 showing a projection of the actuator in an extended state and forming an aperture in a resulting component formed by the mold.
Figure 7:
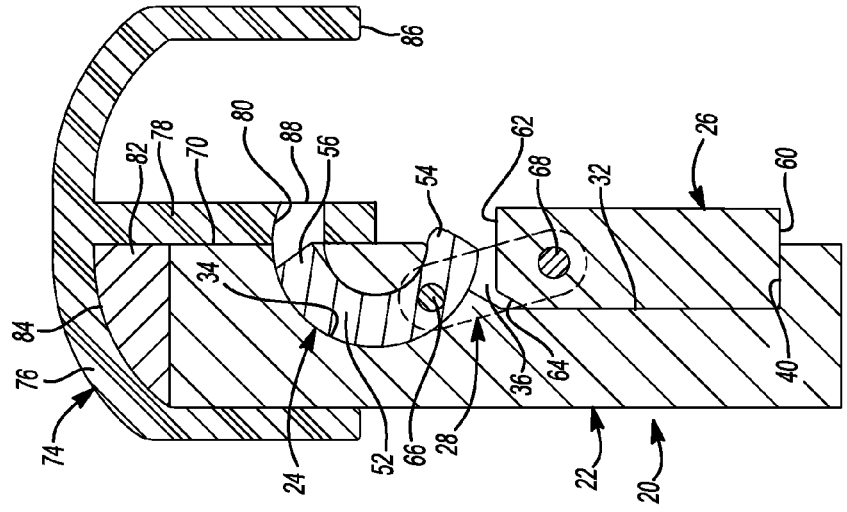
FIG. 7 is a cross-sectional view of the actuator of FIG. 6 showing the projection in a retracted state and removed from the aperture of the resulting component.
Figure 8:
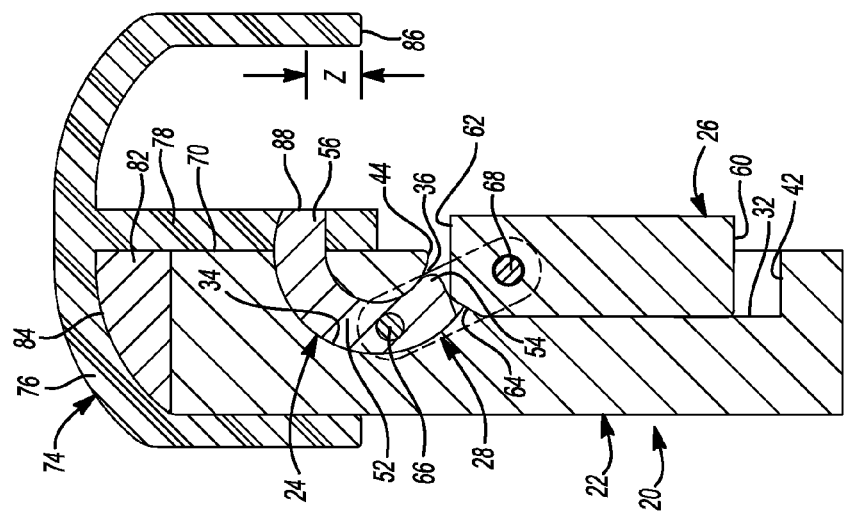
FIG. 8 is a cross-sectional view of an actuator for use with the mold of FIG. 1 showing a projection of the actuator in an extended state and forming an aperture in a resulting component formed by the mold.

As shown in FIG. 1, the first mold half 12 may include an actuator 20 that cooperates with the first cavity 16 and the second cavity 18 to provide a net shape to a molded component (FIGS. 6-8). While the actuator 20 will be described and shown hereinafter in conjunction with the first mold half 12, the second mold half 14 could additionally or alternatively include an actuator 20.

Figures 2, 3:
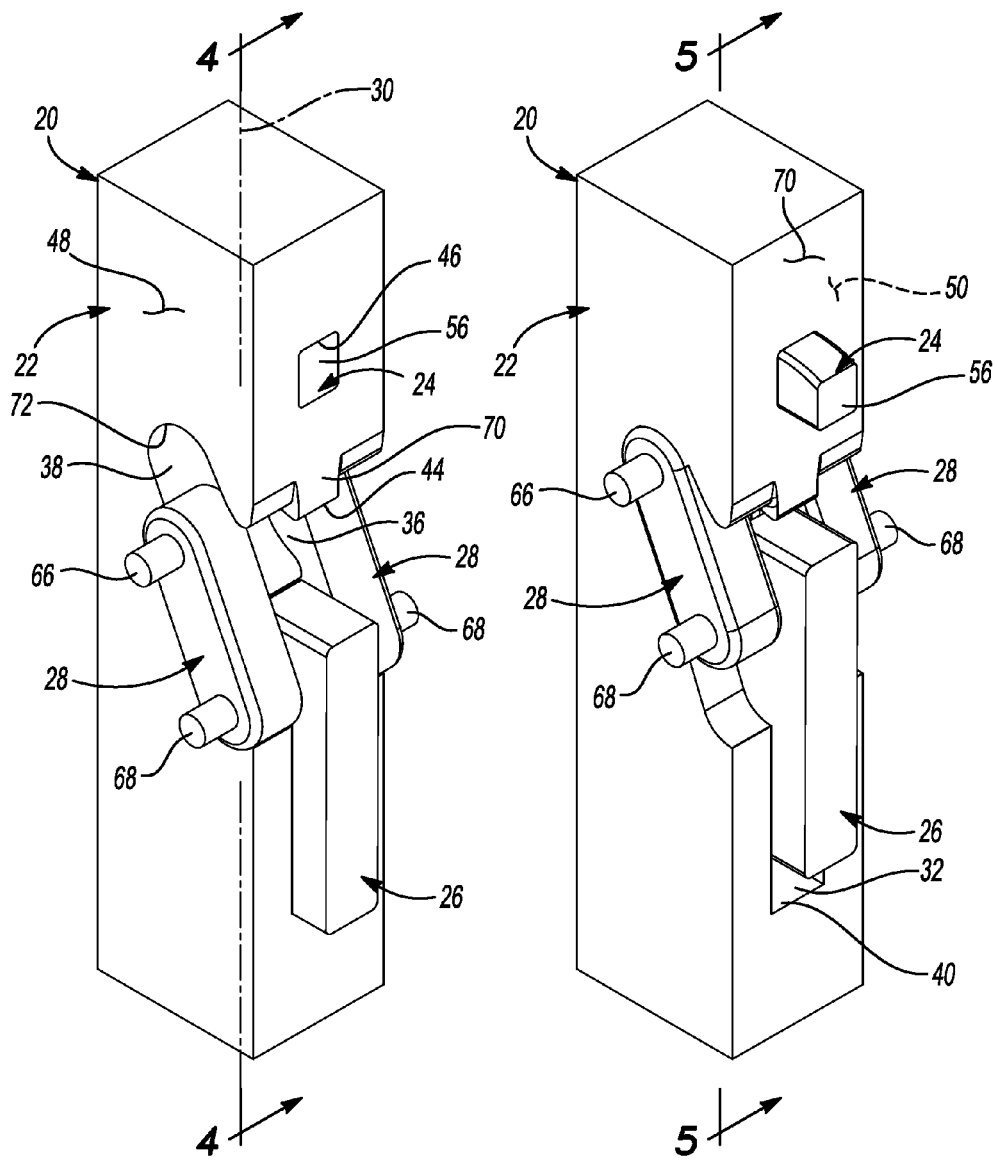
FIG. 2 is a perspective view of an actuator for use with the mold of FIG. 1 showing a projection of the actuator in a retracted state.
FIG. 3 is a perspective view of an actuator for use with the mold of FIG. 1 showing a projection of the actuator in an extended state.

With particular reference to FIGS. 2-5, the actuator 20 is shown to include a housing 22, a projection 24, a cam 26, and a pair of links 28. The housing 22 may be fixedly attached to the first mold half 12 proximate to or within the first cavity 16. Alternatively, the housing 22 may be supported by the first mold half 12 proximate to or within the first cavity 16 such that the housing 22 is movable relative to the first mold half 12 about an axis 30 (FIG. 2).

Regardless of whether the housing 22 is fixed relative to the first mold half 12 or is movable relative to the first mold half 12, the housing 22 may include a channel 32, an arcuate channel 34, an opening 36, and a pair of slots 38. The channel 32 may be formed into the housing 22 and may include a first end 40 and a second end 42. The first end 40 may act as a stop for the cam 26 to limit movement of the cam 26 relative to the housing 22. The second end 42 may be formed at an opposite end of the channel 32 than the first end 40 and may be located at a junction of the channel 32 and the opening 36.

The arcuate channel 34 may be spaced apart from the channel 32 by the opening 36 of the housing 22 and may include a first end 44 disposed proximate to the opening 36 and a second end 46 spaced apart and separated from the first end 44. The arcuate channel 34 may rotatably support the projection 24 relative to the housing 22 to allow the projection 24 to be moved between a retracted state (FIGS. 2 and 4) and an extended state (FIGS. 3 and 5).

The slots 38 may be formed into opposite sides of the housing 22. Accordingly, one of the slots 38 may be formed in an outer surface 48 (FIG. 2) of the housing 22 while the other slot 38 is formed in an outer surface 50 (FIG. 3) of the housing 22 that is formed on an opposite side of the housing 22 than the outer surface 48. As shown in FIGS. 2 and 3, the slots 38 slideably support respective ones of the links 28 relative to the housing 22 during movement of the projection 24 and cam 26 relative to the housing 22, as will be described in greater detail below.

Figure 4:
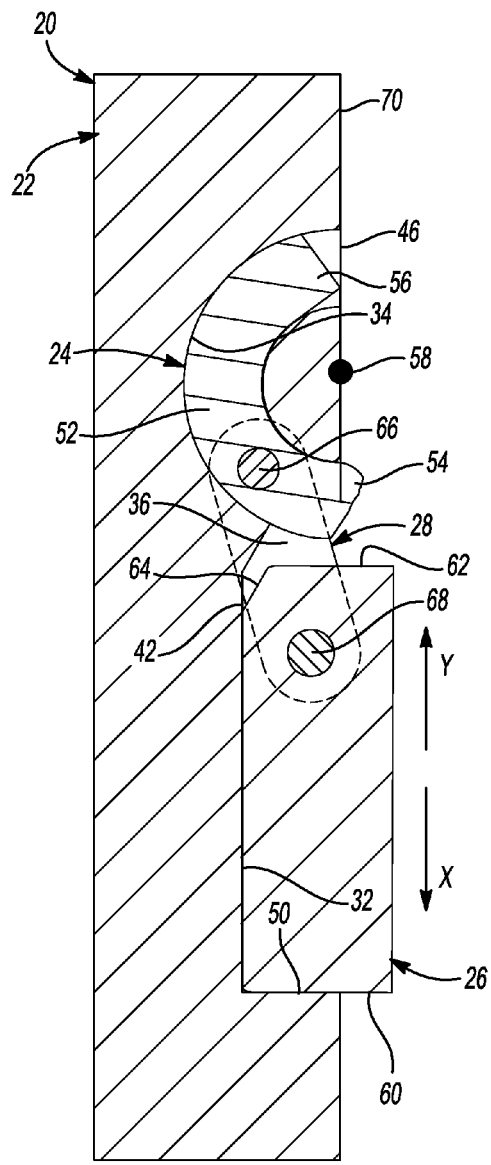
FIG. 4 is a cross-sectional view of the actuator of FIG. 2 taken along line 4-4 of FIG. 2.
Figure 5:
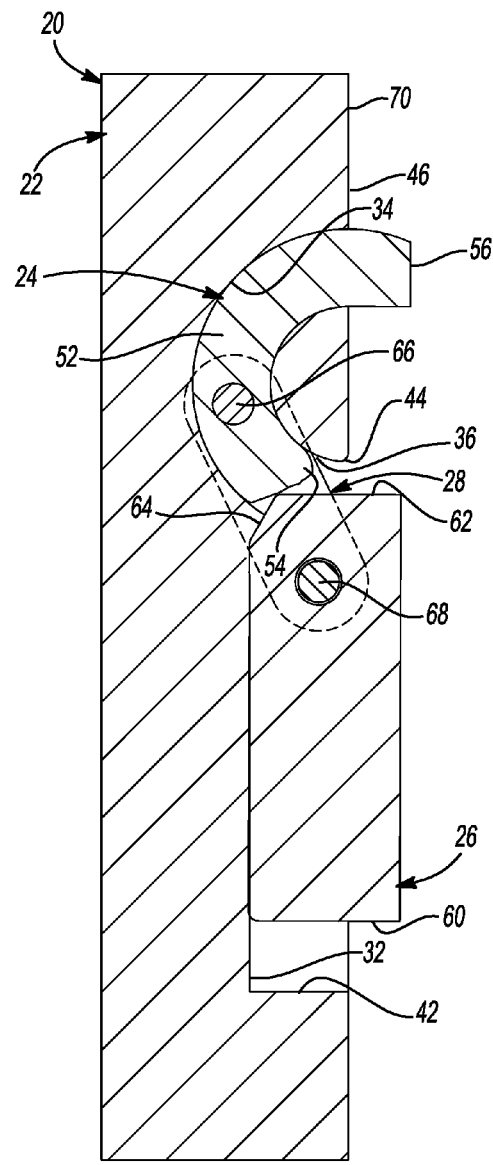
FIG. 5 is a cross-sectional view of the actuator of FIG. 3 taken along line 5-5 of FIG. 3.

With particular reference to FIGS. 3-5, the projection 24 is shown to include a substantially C-shaped main body 52, a first end 54, and a second end 56. The C-shaped main body 52 may be slideably supported within and by the arcuate channel 34 relative to the housing 22 such that movement of the C-shaped main body 52 within and relative to the arcuate channel 34 causes the C-shaped main body 52 to rotate relative to the housing 22 about an axis 58 (FIG. 4). When the projection 24 is in the retracted state (FIG. 4), a portion of the first end 54 may extend from the opening 36 of the housing 22 while the second end 56 is retracted within the housing 22. Conversely, when the projection 24 is in the extended state, the first end 54 may be received entirely within the housing 22 while the second end 56 extends from the housing 22 (FIG. 5).

The cam 26 may cause rotation of the projection 24 between the retracted state and the extended state and may be slideably supported by the housing 22 within the channel 32. The cam 26 may include a first end 60 that opposes the first end 40 of the channel 32 and a second end 62 that opposes and is in contact with the first end 54 of the projection 24. Engagement between the second end 62 of the cam 26 and the second end 42 of the channel 32 acts as a stop to limit movement of the cam 26 in the direction (X), as shown in FIG. 4. The second end 62 may include a tapered surface 64 that is in contact with the first end 54 of the projection 24 when the projection 24 is in the retracted state and when the projection 24 is in the extended state. Providing the cam 26 with the tapered surface 64 facilitates movement of the first end 54 of the projection 24 about and relative to the second end 62 of the cam 26 when the cam 26 moves the projection 24 between the retracted state and the extended state.

The links 28 may be respectively and slideably received within the slots 38 of the housing 22 and may be rotatably attached to the projection 24 via a first pivot 66 and may be rotatably attached to the cam 26 via a second pivot 68. Accordingly, when the cam 26 is moved in a direction substantially parallel to the axis 30 of the housing 22, relative rotation between the cam 26 and the links 28 is permitted by the pivot 68. Likewise, relative rotation between the projection 24 and the links 28 is permitted by the pivot 66.

With continued reference to FIGS. 2-5, operation of the actuator 20 will be described in detail. The projection 24 may be moved from the retracted state (FIG. 2) to the extended state (FIG. 3) by applying a force to the cam 26 to move the cam 26 in a direction (Y), which is substantially opposite to direction (X). The force applied to the cam 26 may be applied via a pneumatic or hydraulic actuator (neither shown). While the force applied to the cam 26 is described as being performed by a pneumatic or hydraulic actuator, any device capable of exerting a force on the cam 26 to move the cam 26 in the direction (Y) and along the axis 30 of the housing 22 may be used.

Movement of the cam 26 along the axis 30 of the housing 22 in the direction (Y) causes the tapered surface 64 of the cam 26 to apply a force on the first end 54 of the projection 24. The force applied to the projection 24 at the first end 54 causes the projection 24 to move relative to and within the arcuate channel 34 such that the projection 24 rotates about the axis 58.

The second end 56 of the projection 24 extends from the second end 46 of the arcuate channel 34 upon sufficient movement of the cam 26 in the direction (Y). At this point, the second end 62 of the cam 26 abuts the housing 22 proximate to the opening 36, thereby preventing further movement of the cam 26 in the direction (Y) and, thus, preventing further movement of the projection 24. When the second end 62 of the cam 26 abuts the housing 22 proximate to the opening 36, the projection 24 is in the extended state and extends from an outer surface 70 of the housing 22.

When the cam 26 is moved in the direction (Y), a force is likewise applied to the links 28 via the pivots 68. The force applied to the links 28 via the cam 26 causes the links 28 to move relative to and within the respective slots 38 until the links 28 contact an end 72 of each slot 38 (FIG. 2). Engagement between the links 28 and the ends 72 of the respective slots 38 likewise prevents further movement of the cam 26 in the direction (Y). As described above, preventing movement of the cam 26 in the direction (Y) likewise prevents further rotation of the projection 24 about the axis 58. At this point, the projection 24 is in the extended state and may be maintained in the extended state, provided the force exerted on the cam 26 is maintained.

Once the force exerted on the cam 26 is withdrawn, the cam 26 may be moved in the direction (X). Movement of the cam 26 in the direction (X) may likewise be performed by the same pneumatic or hydraulic actuator that causes movement of the cam 26 in the direction (Y). Alternatively, a separate actuator (hydraulic, pneumatic, or otherwise) may be associated with the cam 26 to cause movement of the cam 26 in the direction (X) such that the cam 26 is moved in the respective directions (X, Y) by different actuators. Regardless of the particular actuator used to move the cam 26 in the direction (X), movement of the cam 26 in the direction (X) likewise causes rotation of the projection 24 about the axis 58 due to the connection of the cam 26 to the projection 24 via the links 28.

When the cam 26 is moved in the direction (X), a force is likewise transmitted to the links 28 via the pivots 68. The force transmitted to the links 28 via the pivots 68 causes the links 28 to move relative to and within the slots 38 such that the links 28 move in a direction substantially away from the end 72 of each slot 38. Movement of the links 28 in a direction substantially away from the end 72 of each slot 38 applies a force on the projection 24 due to the rotatable attachment of the links 28 to the projection 24 at the pivots 66.

The force applied on the projection 24 via the links 28 causes the projection 24 to rotate about the axis 58 such that the second end 56 of the projection 24 is moved into and within the housing 22. Once the second end 56 of the projection 24 is disposed within the housing 22, the projection 24 is returned to the retracted state and no portion of the projection 24 extends from the outer surface 70 of the housing 22.

With particular reference to FIGS. 1, 6, and 7, the actuator 20 is shown in conjunction with the mold 10 and in conjunction with a component 74 formed by the first cavity 16, the second cavity 18, and the actuator 20. While the mold 10 and associated actuator 20 may be used to form virtually any component having virtually any shape, the mold 10 and actuator 20 will be shown and described in conjunction with a component 74 having a substantially U-shaped base 76 formed integrally with a stem 78 having an aperture 80 formed therethrough.

As shown in FIG. 1, the actuator 20 may be supported by the first mold half 12 such that the actuator 20 is disposed proximate to and/or within the first cavity 16. The housing 22 may be fixed relative to the first mold half 12 or, alternatively, may be movable along the axis 30 relative to the first mold half 12. Regardless of whether the actuator 20 is fixed or movable relative to the first mold half 12, the actuator 20 may cooperate with the first cavity 16 and the second cavity 18 to provide the shape of the component 74. Namely, the shape of the first cavity 16 and the second cavity 18 may provide the component 74 with the shape shown in FIGS. 6 and 7. Likewise, the projection 24 of the actuator 20 may provide the stem 78 of the component 74 with the aperture 80, as will be described in greater detail below.

When the first mold half 12 is moved into engagement with the second mold half 14, the first cavity 16 cooperates with the second cavity 18 to provide a void (not labeled) having the shape of the component 74 shown in FIGS. 6 and 7. At this point, the cam 26 may be moved in the direction (Y) such that the projection 24 is moved into the extended state (FIG. 5) such that the second end 56 of the projection 24 extends from the outer surface 70 of the housing 22. Extending the second end 56 of the projection 24 from the outer surface 70 causes the projection 24 to extend into the first cavity 16 and the second cavity 18. Accordingly, the second end 56 of the projection 24 may be used to form the aperture 80 in the component 74 when molten resin is injected into the first cavity 16 and the second cavity 18.

Molten resin may be injected into the first cavity 16 and the second cavity 18 when the first mold half 12 and the second mold half 14 are in the closed state. The molten resin flows into the first cavity 16 and the second cavity 18 and substantially fills the first cavity 16 and the second cavity 18, forming the component 74 having a shape defined by the first cavity 16 and the second cavity 18. Likewise, because the second end 56 of the projection 24 extends into the first cavity 16 and the second cavity 18, the molten resin flows around the second end 56 and provides the component 74 with the aperture 80. In other words, the second end 56 of the projection 24 prevents the molten resin from filling the stem 78 at the aperture 80, thereby providing the stem 78 with a void (i.e., aperture 80).

Once the component 74 is sufficiently cooled, the first mold half 12 and the second mold half 14 may be separated. At this point, a force may be applied to the cam 26 to move the cam 26 in the direction (X) to cause the second end 56 of the projection 24 to be moved into the retracted state. Movement of the second end 56 of the projection 24 into the housing 22 allows the component 74 to be removed from the mold 10. Such movement of the second end 56 of the projection 24 may even cause the component 74 to be ejected from the mold 10.

If the housing 22 is fixed relative to the first mold half 12, the actuator 20 remains fixed as the component 74 is ejected from the mold 10. If, however, the housing 22 is movable along the axis 30 relative to the first mold half 12, the housing 22 may be moved relative to the first mold half 12 and, thus, relative to the formed component 74 once the projection 24 is moved into the retracted state. Namely, once the projection 24 is moved into the retracted state, the housing 22 may be moved in the direction (X) and away from the U-shaped base 76 of the component 74 to facilitate ejection of the component 74 from the mold 10.

With continued reference to FIGS. 6 and 7, the housing 22 is shown to include a cap 82 located at an opposite end of the housing 22 than the channel 32. The cap 82 may include an outer surface 84 that forms the shape of the U-shaped base 76 of the component 74.

While the housing 22 is shown as including a separate cap 82 that forms a shape of the U-shaped base 76 of the component 74, the housing 22 could alternatively include an integrally formed cap, as shown in FIG. 8. Like reference numerals are used hereinafter and in the drawings to identify like components while like reference numerals containing letter extensions are used to identify those components that have been modified.

The actuator 20a is substantially identical to the actuator 20 with the exception of the housing 22a. Namely, the housing 22a may include an integrally formed top cap 82a that provides the U-shaped base 76 with a desired shape upon formation of the component 74.

The foregoing actuators 20, 20a allow the component 74 to include a U-shaped base 76 that extends substantially in the direction (X) lower than the aperture 80. For example, an end 86 of the U-shaped base 76 may extend in the direction (X) to a greater extent than a central axis 88 of the aperture 80. In one configuration, the end 86 of the U-shaped base 76 may extend in the direction (X) and past the central axis 88 an amount (Z), as shown in FIG. 6.

The foregoing configuration of the component 74 (i.e., the position of the end 86 relative to the central axis 88 of the aperture 80) is permitted due to the projection 24 being rotatable relative to the actuator 20, 20a and relative to the mold halves 12, 14. If the projection 24 were linearly actuated such that the projection 24 were moved between the extended state and the retracted state in a direction along the axis 88, such actuation of the projection 24 would not be permitted, as the U-shaped base 76—at the stem 78—would interfere with the projection 24. Accordingly, allowing the projection 24 to rotate about the axis 58 allows the mold 10 to produce the component 74 having the U-shaped base 76 described above.

What is claimed is:

1. An actuator for an injection mold, the actuator comprising:
   a housing defining an arcuate channel that extends within said housing between a first end and a second end;
   a projection slidingly received in said arcuate channel such that said projection is rotatably supported by said housing and is movable between an extended state and a retracted state, said projection having a first end and a second end opposite said first end;
   a cam adjacent said housing, said housing and said cam being operable to translate relative to one another; and
   at least one link extending between and pivotally coupled to said projection and said cam that cooperates with said cam to selectively move said projection between said extended state and said retracted state relative to said housing, wherein said second end of said projection projects outwardly from said second end of said arcuate channel in said extended state, and wherein said second end of said projection is retracted into said arcuate channel in said retracted state.

2. The actuator of claim 1, wherein said cam is slidably supported by said housing between a first state and a second state, said cam moving said projection into said extended state when in said first state and moving said projection into said retracted state when in said second state.

3. The actuator of claim 1, wherein said projection has a C-shaped body that extends between said first end of said projection and said second end of said projection.

4. The actuator of claim 1, wherein said cam includes a first end and a second end opposite said first end and wherein said at least one link is pivotably coupled to said projection at said first end of said projection and is pivotably coupled to said cam at said second end of said cam, said at least one link being operable to transmit a force from said cam to said projection to move said projection between said extended state and said retracted state.

5. The actuator of claim 4, wherein said at least one link is a pair of links including a first link and a second link, each extending between said projection and said cam.

6. The actuator of claim 5, wherein said second link is pivotably coupled to said projection at said first end of said projection and is pivotably coupled to said cam at said second end of said cam, said second link being operable to transmit a force from said cam to said projection to move said projection between said extended state and said retracted state.

7. The actuator of claim 5, wherein said second link is disposed on an opposite side of said cam than said first link.

8. The actuator of claim 2, wherein said cam includes a first end, a second end opposite said first end, and an engagement surface at said second end of said cam that is operable to contact said first end of said projection when said cam is in said first state to move said projection into said extended state.

9. The actuator of claim 8, wherein said engagement surface of said cam is in contact with said first end of said projection when said cam is in said first state and said second state.

10. The actuator of claim 2, wherein said housing remains stationary when said cam translates between said first state and said second state.

11. The actuator of claim 1, wherein said cam remains stationary and said housing translates relative to said cam to move said projection between said extended state and said retracted state.

12. The actuator of claim 2, wherein said housing includes a stop operable to engage said cam when said cam is in said first state to limit movement of said cam relative to said housing.

13. The actuator of claim 1, wherein said cam is slidably received within a slot of said housing.

14. A mold for creating an injection molded component, said mold comprising:
   a first mold half;
   a second mold half cooperating with said first mold half to define a cavity;
   an actuator supported by at least one of said first mold half and said second mold half;
   said actuator including a housing having an arcuate channel that extends within said housing between a first end and a second end, said second end being open to said cavity;
   said actuator including a projection slidingly received in said arcuate channel such that said projection is selectively rotatable relative to said housing between an extended state and a retracted state;
   said projection having a first end and a second end where said second end of said projection extends from said second end of said arcuate channel and into said cavity when said projection is in said extended state and where said second end of said projection is retracted into said arcuate channel when said projection is in said retracted state; and
   a cam disposed adjacent said housing, said cam and said housing being operable to translate relative to one another to move said projection between said retracted state and said extended state.

15. The mold of claim 14, wherein said second end of said projection projects into said cavity in said extended state to create a molded feature in the injection molded component formed in said cavity and wherein said second end of said projection is disposed within said arcuate channel in said retracted state such that said projection does not interfere with removal of the molded component from said cavity.

16. The mold of claim 14, wherein said housing is fixed relative to said one of said first mold half and said second mold half.

17. The mold of claim 14, wherein said housing is movable relative to said one of said first mold half and said second mold half.

18. The mold of claim 14, wherein said projection has a C-shaped body that extends between said first end of said projection and said second end of said projection.

19. The mold of claim 14, wherein said actuator includes a link extending between said cam and said projection that is operable to transmit a force from said cam to said projection to move said projection between said extended state and said retracted state.

20. The mold of claim 14, wherein said cam is linearly movable relative to said housing to move said projection between said extended state and said retracted state.

* * * * *